Patented May 31, 1932

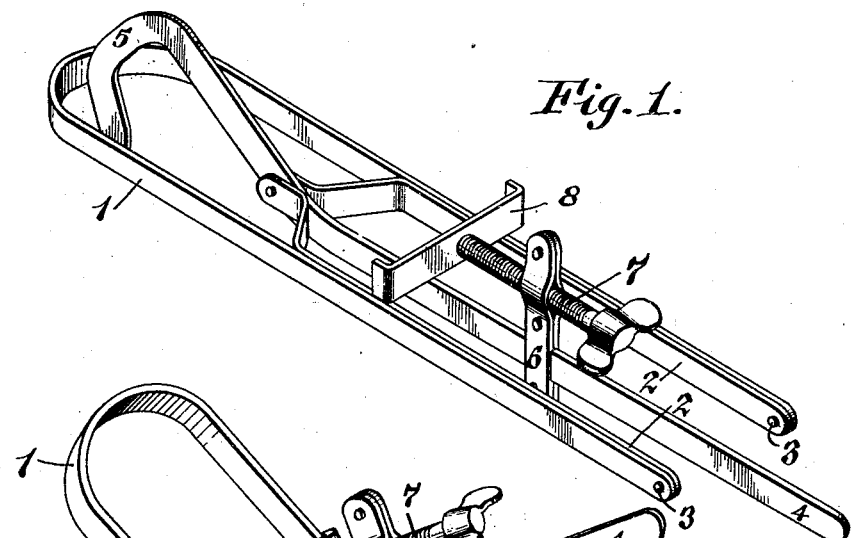
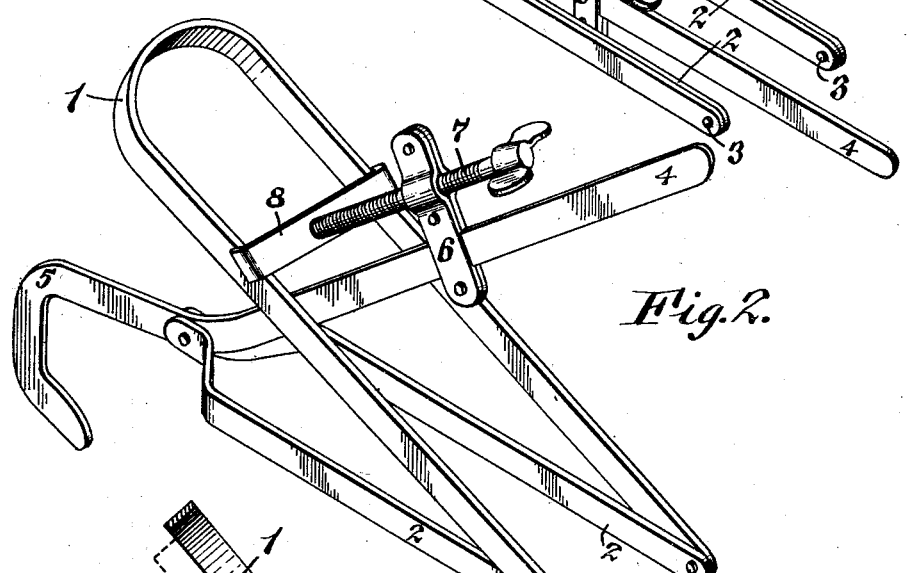
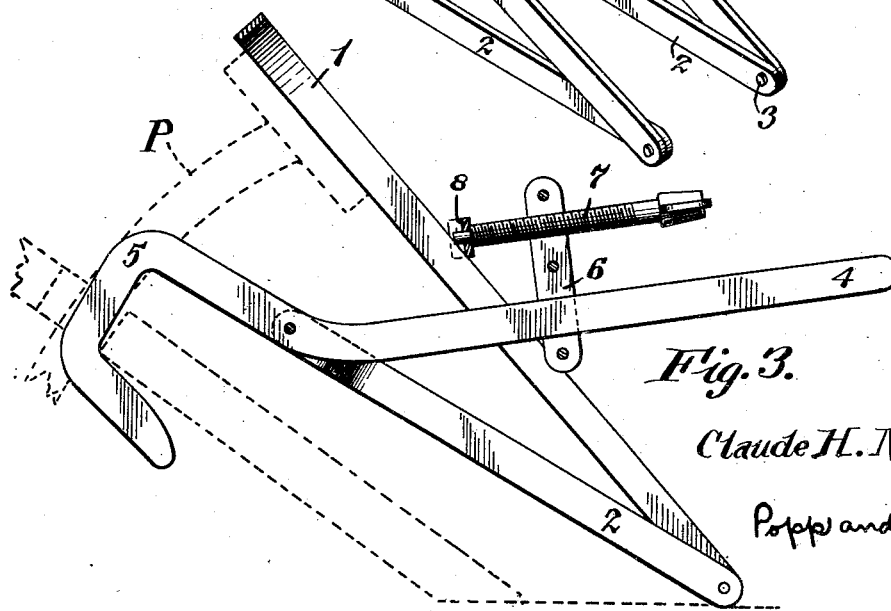

1,861,023

UNITED STATES PATENT OFFICE

CLAUDE H. NABER, OF HAMBURG, NEW YORK, ASSIGNOR OF ONE-HALF TO NORMAN HAAS, OF HAMBURG, NEW YORK

BRAKE PEDAL HOLDING DEVICE

Application filed April 16, 1929, Serial No. 355,632. Renewed October 24, 1931.

This invention relates to devices for holding one or more pedals of a vehicle in a depressed position so that the brakes, for example, may be repaired, relined or adjusted.

The principal object of the invention is to provide a construction which may be easily and quickly applied to the brake pedal of any of the existing types of automobiles and trucks now in common use, to hold the same in any position to which it may be moved.

Another object of the invention is to provide a device by which the pedal may be moved to obtain very small adjustments.

A further object is to provide a simple, compact and sturdy construction which may be folded together when not in use so as to occupy a minimum of space thereby facilitating the packing shipping and/or storing of the device.
Generally stated the invention resides in the provision of a member which may be arranged adjacent the pedal of a vehicle and pivotally moved within such limits as to compel its engagement with the pedal throughout the latter's range of movement, and an element which is mounted upon a standard for slidable movement in the direction of said member whereby the element is adapted to engage said member to hold it in any position to which it may be depressed. The invention also resides in the provision of a turnable threaded member which is connected to said element and arranged so that when the element is functioning to hold the pedal engaging member in a depressed position, it may be turned to effect a small and accurate additional adjustment of the pedal engaging member. The invention further resides in the novel arrangement of the parts which permits the device to be folded so as to occupy a minimum of space when not in use.

An embodiment of the invention is illustrated in the accompanying drawings, wherein:

Figure 1 is a perspective of the device as it appears when folded for packing, etc.

Figure 2 is a perspective of the device as it appears when opened for use.
Figure 3 is a longitudinal section showing the device applied to the pedal of a vehicle.

In accordance with the invention, a pedal engaging member 1 is utilized which preferably is made in the form of a U. The opposite ends of the member 1 are pivotally connected to a pair of arms or links 2 by pivot pins 3, the pivotal connections of the links preferably extending between the pivotal connections of the member 1. The opposite ends of the links 2 extend toward each other and pivotally carry between them a standard 4, one end of which is made in the form of a hook as at 5. The standard 4 carries a slidably mounted element 6 which is adapted, when canted, to bind on the standard. This element, in turn, carries a screw 7 which extends substantially parallel to the standard and upon one end of which is mounted a cross bar 8. The cross bar 8 is adapted for engagement with the legs of the pedal engaging member 1 and, to this end, has its ends bent to engage the outer sides of the member 1 so as to prevent the bar 8 from turning relatively to the member during its engagement therewith.

In the use of the device, it is arranged adjacent the pedal P which is to be depressed (see Figure 3) with its hook 5 in engagement with the floor of the vehicle at the aperture through which the pedal projects, the standard 4 extending rearwardly therefrom at an angle to the floor and passing between the legs of the U-shaped pedal engaging member 1. The upper portion of the member 1 is arranged for movement into engagement with the pedal, the pivotal connection of the member 1 with the links 2 being set upon the floor. The pedal may now be depressed to the desired position by suitably depressing the pedal and the member. As this is accomplished, the slidable element 6 will slide along the standard, by gravity, if the inclination of the standard is sharp enough. If the inclination is not sufficient to compel the element 6 to slide by gravity, it will, of course, be necessary to move it manually. In either case, the movement brings the bar 8 into engagement with the member 1 at the depressed position. The member 1 may now be released inasmuch as the upward force of the pedal causes the element 6 to bind on the standard thereby preventing a return movement of the pedal. The pedal thus being securely held in the proper position, the operative is free to make the desired repair or adjustment. If it be desired to effect a small forward or return movement of the pedal from this position, it is only necessary to turn the screw 7 in the proper direction and to the extent desired. Upon the completion of the operation, the device may be removed simply by depressing the pedal slightly further to relieve the canting pressure on the element and thereby permit the element to be moved manually toward its original and inoperative position at which time the device may be unhooked from the pedal aperture.

The proposed construction has one particular advantage in that it may be made suitable for use on any automobile or similar vehicle now in common use simply by making the hook member wide enough to engage the thickest floor and the pedal engaging member long enough to engage the highest pedal. The construction has a further advantage inasmuch as the pivot point of the pedal engaging member can be arranged near the pivot point of the engaged pedal whereby flush engagement between these parts will be insured.

Having described my invention, I claim:

1. A device for holding the foot pedal of a vehicle in a depressed position comprising a pedal engaging member adapted to be rested upon the floor of the vehicle at a point adjacent the pedal thereof for pivotal movement about said point within such limits that its engagement with the pedal substantially throughout the latter's range of movement may be effected, a standard adapted to be arranged substantially parallel to the plane of motion of said member and to extend adjacent and at an angle thereto, and an element mounted for movement along said standard and adapted to engage said member to prevent its movement in a direction reverse to the depressing movement of said pedal whereby said member is effective to hold said pedal in a position along its range of movement to which it may be moved.

2. A device for holding the foot pedal of a vehicle in a depressed position comprising a pedal engaging member adapted to be rested upon the floor of the vehicle at a point adjacent the pedal thereof for pivotal movement about said point within such limits that its engagement with the pedal substantially throughout the latter's range of movement may be effected, a standard adapted to be arranged substantially parallel to the plane of motion of said member and to extend adjacent and at an angle thereto, and an element mounted for slidable movement along said standard and adapted to bind thereon when canted, said element being arranged to engage said member during its movement along said standard and to move to a canted position when so engaged so as to prevent a movement of said member in a direction reverse to the depressing movement of said pedal whereby said member is effective to hold said pedal in a position along its range of movement to which it may be moved.

3. A device for holding the foot pedal of a vehicle in a depressed position comprising a pedal engaging member adapted to be rested upon the floor of the vehicle at a point adjacent the pedal thereof for pivotal movement about said point within such limits that its engagement with the pedal substantially throughout the latter's range of movement may be effected, a standard adapted to be arranged substantially parallel to the plane of motion of said member and to extend adjacent and at an angle thereto, an element mounted for movement along said standard and adapted to engage said member to prevent its movement in a direction reverse to the depressing movement of said pedal whereby said member is effective to hold said pedal in a position along its range of movement to which it may be moved, said element being adjustable by small increments without movement along said standard for effecting a slight adjusting movement of said pedal from the position in which it may be held.

4. A device for holding the foot pedal of a vehicle in a depressed position comprising a pedal engaging member adapted to be rested upon the floor of the vehicle at a point adjacent the pedal thereof for pivotal movement about said point within such limits that its engagement with the pedal substantially throughout the latter's range of movement may be effected, a standard adapted to be arranged substantially parallel to the plane of motion of said member and to extend adjacent and at an angle thereto, a body mounted for movement along said standard and an element carried by said body and adapted to engage said member during its movement along said standard so as to prevent a movement of said member in a direction reverse to the depressing movement of said pedal whereby said member is effective to hold said pedal in a position along its range of movement to which it may be moved.

5. A device for holding the foot pedal of a vehicle in a depressed position comprising a pedal engaging member adapted to be rested upon the floor of the vehicle at a point adjacent the pedal thereof for pivotal movement about said point within such limits that its engagement with the pedal substantially throughout the latter's range of movement may be effected, a standard adapted to be arranged substantially parallel to the plane of motion of said member and to extend adjacent and at an angle thereto, a body mounted for movement along said standard, an element carried by said body and adapted to engage said member to prevent the movement of said member in a direction reverse to the depressing movement of said pedal whereby said member is effective to hold said pedal in a position along the range of movement of said pedal and to which it may be moved, and means for effecting a slight movement of said element relatively to said body whereby to effect a slight adjustment in the position of said pedal.

6. A device for holding the foot pedal of a vehicle in a depressed position comprising a hook member adapted to engage the floor of a vehicle at the aperture through which the pedal to be depressed projects and to extend rearwardly therefrom at an angle to the floor, a link pivoted to said member adjacent the hook end thereof and adapted to extend rearwardly into engagement with the floor, a pedal engaging member pivoted to said link and adapted to extend upwardly beyond and adjacent to the rearward extension of said hook member whereby it may be pivotally moved within limits compelling its engagement with the pedal of the vehicle substantially throughout the depressing movement of the same, and an element slidably carried by the rearward extension of said hook member and adapted for engagement with said pedal engaging member to hold the same against movement in a direction reverse to the depressing movement of the pedal.

7. A device for holding the foot pedal of a vehicle in a depressed position comprising a hook member adapted to engage the floor of a vehicle at the aperture through which the pedal to be depressed projects and to extend rearwardly therefrom at an angle to the floor, a link pivoted to said member adjacent the hook end thereof and adapted to extend rearwardly into engagement with the floor, a pedal engaging member pivoted to said link and adapted to extend upwardly beyond and adjacent to the rearward extension of said hook member whereby it may be pivotally moved within limits compelling its engagement with the pedal of the vehicle substantially throughout the depressing movement of the same, a body mounted for movement along the rearward extension of said hook member, and an element carried by said body and adapted to engage said pedal engaging member to prevent the movement of the latter in a direction reverse to the depressing movement of said pedal whereby said pedal engaging member is effective to hold said pedal in a position to which it may be moved.

8. A device for holding the foot pedal of a vehicle in a depressed position comprising a hook member adapted to engage the floor of a vehicle at the aperture through which the pedal to be depressed projects and to extend rearwardly therefrom at an angle to the floor, a link pivoted to said member adjacent the hook end thereof and adapted to extend rearwardly into engagement with the floor, a pedal engaging member pivoted to said link and adapted to extend upwardly beyond and adjacent to the rearward extension of said hook member whereby it may be pivotally moved within limits compelling its engagement with the pedal of the vehicle substantially throughout the depressing movement of the same, a body mounted for movement along the rearward extension of said hook member, an element carried by said body and adapted to engage said pedal engaging member to prevent the movement of the latter in a direction reverse to the depressing movement of said pedal whereby said pedal engaging member is effective to hold said pedal in a position to which it may be moved, and means for effecting a limited accurate movement of said element relatively to said body whereby to effect a further adjustment in the position of said pedal.

In testimony whereof I affix my signature.
CLAUDE H. NABER.